June 23, 1970     R. MADDEN ET AL     3,516,596
CITRUS FRUIT AND VEGETABLE SHIPPING CONTAINER
Filed Aug. 19, 1968     2 Sheets-Sheet 1
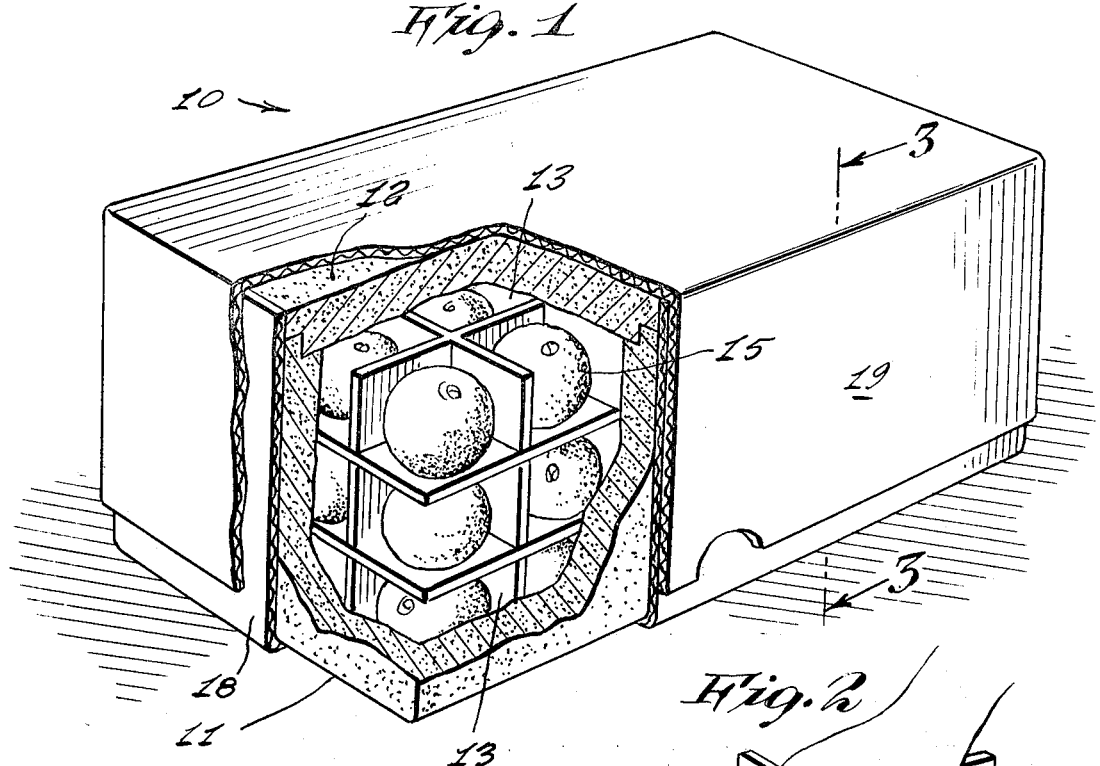
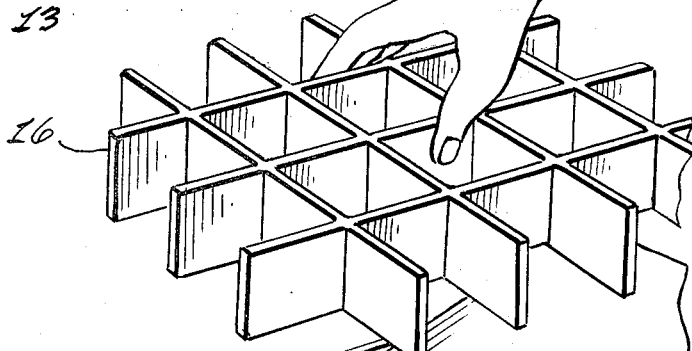
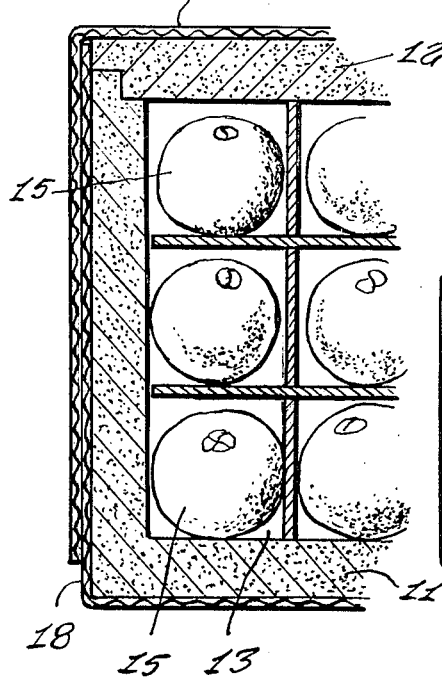
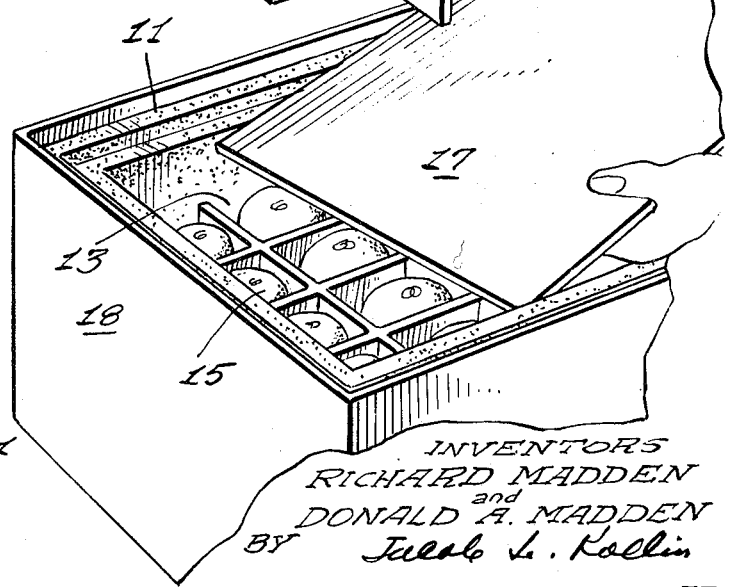
INVENTORS
RICHARD MADDEN
and
DONALD A. MADDEN
BY
ATTORNEY

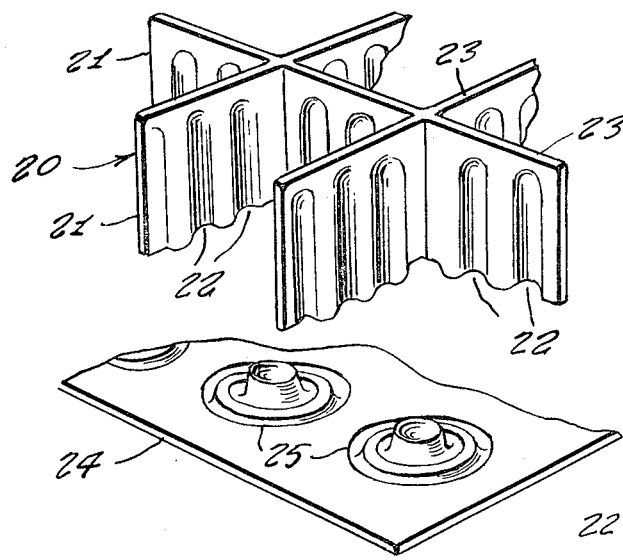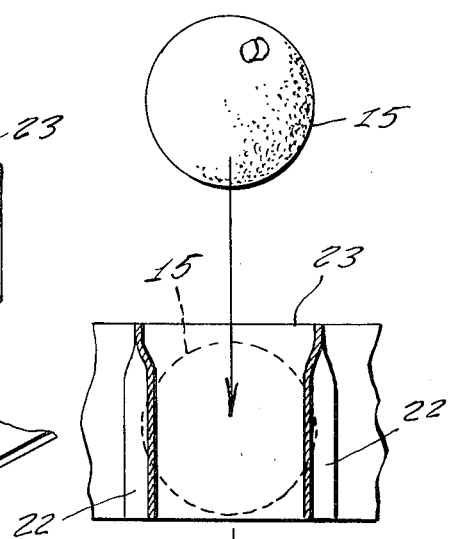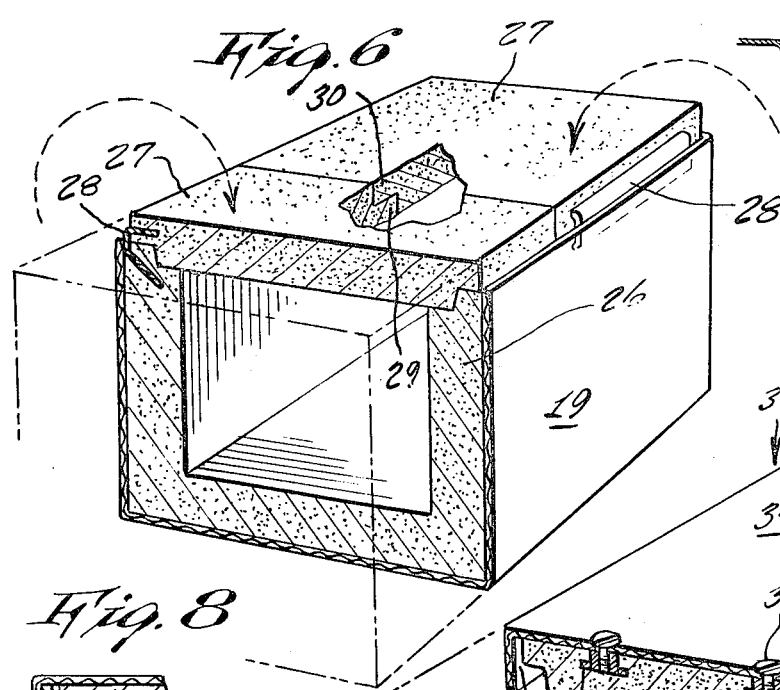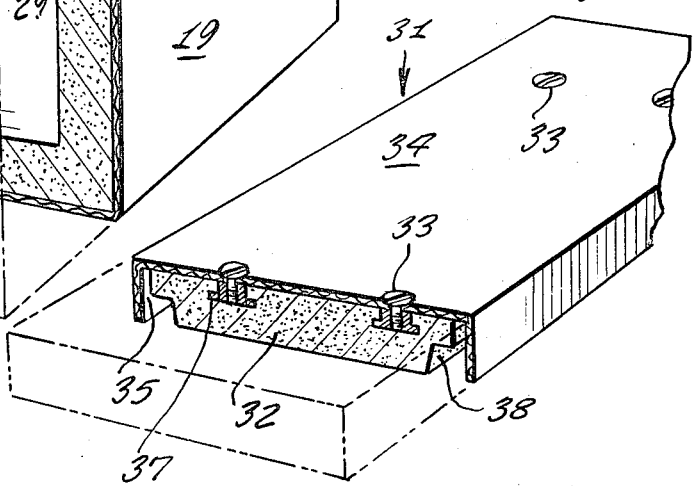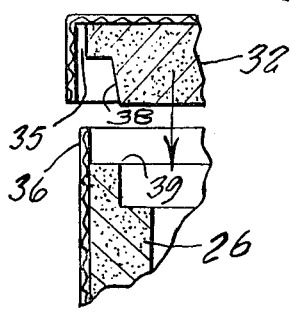

United States Patent Office 3,516,596
Patented June 23, 1970

3,516,596
CITRUS FRUIT AND VEGETABLE SHIPPING CONTAINER
Richard Madden, 3659 Russell Ave. 45226, and Donald A. Madden, 5418 Eastwood Drive 45227, both of Cincinnati, Ohio
Filed Aug. 19, 1968, Ser. No. 753,404
Int. Cl. B65d 5/56
U.S. Cl. 229—42                                    4 Claims

ABSTRACT OF THE DISCLOSURE

A container for shipment commercially of citrus fruit and other produce, the container being comprised of an air tight foamed polystyrene enclosure encased within a protective cardboard box, and the container having the characteristics of preserving the produce in a fresh condition over longer periods of time than has been possible heretofore.

---

This invention relates generally to produce shipping containers such as are used in the industry.

It is generally well known to those skilled in the art that it is difficult to preserve produce in shipment over relatively long periods of time without certain amount spoilage, which decreases the amount of profit from a particular shipment. Heretofore produce has been shipped in conventional containers from the growers to the distributors, the containers having proved inadequate for a maximum preservation of the produce during this period. In view that such shipment comprises a major industry involving many millons of dollars, it will be readily apparent that spoilage costs can comprise large financial figures and can be a determining factor whether a crop will be profitable at all.

Accordingly it is a principal object of the present invention to provide a citrus fruit and vegetable shipping container having self-contained means to preserve produce over a greatly extended time so to increase the profit of a shipment.

Another object is to provide a shipping container which, by actual test, has proved to maintain citrus fruits at a peak freshness without spoilage for over three months.

Another object is to provide a shipping container for produce which is most effective when used in combination with regular refrigeration periods.

Yet another object is to provide a shipping container which is air tight so to discourage entry of substances which might germinate mold.

Other objects are to provide a citrus fruit and vegetable shipping container which is simple in design, inexpensive to manufacture, easy to use and efficient in operation.

These and other objects will be readily evident upon a study of the following specification and the accompanying drawing wherein:

FIG. 1 is a perspective view of the present invention shown partly in cross section, FIG. 2 is a perspective view thereof shown being assembled during fruit packing operation, FIG. 3 is a cross sectional view taken on line 3—3 of FIG. 1, FIG. 4 is a fragmentary perspective view of a modified partition and separator panel for the container, FIG. 5 is a cross sectional view thereof taken on line 5—5 of FIG. 4, FIG. 6 is a cross sectional perspective view of a modified container, FIG. 7 is a cross sectional perspective view of a modified cover unit, and FIG. 8 is a cross sectional thereof in position for fitting over a case.

Referring now to the drawings in detail, and more particularly to FIGS. 1 to 3, the reference numeral 10 represents a citrus fruit and vegetable shipping container according to the present invention wherein there is a foamed polystyrene case 11 having a foamed polystyrene cover 12 removably fitted thereupon in an air tight manner. The case interior is divided into a plurality of compartments 13 for storing individually citrus fruits 15. The compartments are formed by means of cross walled partitions 16 and separator panels 17 therebetween, which are assembled into the case during the packing operation. It will thus be evident that each fruit is individually compartmented so to not squeeze or bruise an adjacent fruit.

In operative use, after the case is fully packed, the cover 12 is fitted thereupon. The case may be already seated in a corrugated cardboard case 18 during packing, and the cover is then closed by a corrugated cardboard cover 19 thus fully encasing the fruit for commercial shipment.

Experiments have proven that the produce within the container can be further preserved in full freshness for over three months if the loaded container is refrigerated periodically every 4 or 5 days by lowering the temperature to approximately 30 to 35 degrees.

In FIGS. 4 and 5, a modified partition 20 is made of flexible thin plastic, the walls 21 thereof having vertical corrugations 22 which originate below the uncorrugated upper edge 23, the corrugations being deflectable sidewardly to accommodate larger or smaller fruits. The separator panel 24 is provided with concentric, circular corrugations 25 to allow vertical deflection upwardly or downwardly to accommodate oversized or undersized fruits in adjacent compartments.

In FIG. 6 a modified foamed polystyrene case 26 is shown having a pair of hinged covers 27, each of which is secured by a polyethylene hinge 28 heat sealed to an opposite edge of the case so to pivot from opposite directions to each other. One cover includes a lower flange 29 over which an upper flange 30 of the other cover seats itself.

In FIG. 7 a modified cover assembly 31 includes a foamed polystyrene cover member 32 secured by removable screws 33 to corrugated cardboard cover 34 which has a height equal to the thickness of the foamed polystyrene cover, thus allowing stacking thereof at the loading station. A groove 35 around the sides of the foamed polystyrene allows entry therein of the upper edge 36 of the cardboard case. Threaded bushings 37 in the foamed polystyrene cover receive the screws 33.

In order to insure an absolutely air tight seal, the foamed polystyrene cover 32 shown in FIGS. 6 to 8 includes a tapering wall or sealing edge 38 which squeezes against corner or angular sealing edge 39 of the foamed polystyrene case upon engagement, to form a strong seal.

It is understood that the containers may be made in any size, and may be used without the partitions and separators to suit other produce.

While various changes may be made in the detail construction, it is understood that such changes will be within the spirit and scope of the present invention as is defined by the appended claims.

We claim:

1. In a citrus fruit and vegetable shipping container, the combination of a foamed polystyrene case and cover fitted within a corrugated cardboard case and cover, said foamed polystyrene cover forming an air tight seal with said polystyrene case, and a plurality of removable cross walled partitions between removable separator panels forming a plurality of compartments within said polystyrene case, and wherein said polystyrene cover comprises a pair of cover members, each said member being hingedly secured by a hinge to an opposite side edge of said polystyrene case from the other said member.

2. In a citrus fruit and vegetable shipping container, the combination of a seamless foamed plastic case and a seamless foamed plastic cover therefor, said foamed plastic case being removably slip fitted within a corrugated cardboard case which facially engages it on its outside surface, a removable corrugated cardboard cover having a depending peripheral side wall facially engaging the top of said foamed plastic cover when the latter is in closing position on the foamed plastic case and with the said cover sidewall surrounding the outside surface of said cardboard case, one of said foamed plastic case and cover having a tapered sealing edge, the other of said foamed plastic case and cover having an angular sealing edge, the two edges wedgingly and frictionally engaging one another when said cover is in closing position on said case to form an air tight seal.

3. The combination set forth in claim 2 wherein said container includes a plurality of removable cross walled partitions between removable separator panels forming a plurality of compartments within said foamed plastic case, said cross walled partitions being of flexible plastic and having vertical corrugations communicating with a lower edge thereof.

4. The combination as set forth in claim 3 wherein each separator panel has a plurality of concentric circular corrugations at each said compartment for vertical flexing.

References Cited

UNITED STATES PATENTS

| | | | |
|---|---|---|---|
| 1,222,753 | 4/1917 | Gareau | 229—14 |
| 1,382,787 | 6/1921 | Bombard | 217—34 |
| 1,429,207 | 9/1922 | Koppelman et al. | 217—27 |
| 2,951,605 | 9/1960 | Flynn | 217—35 |
| 3,105,376 | 10/1963 | Haslett. | |
| 3,225,983 | 12/1965 | Majka | 220—9 X |
| 3,236,206 | 2/1966 | Willinger | 229—14 X |
| 3,282,462 | 11/1966 | Box | 220—29 |
| 3,344,973 | 10/1967 | Studen | 229—14 X |

JOSEPH R. LECLAIR, Primary Examiner

J. R. GARRETT, Assistant Examiner

U.S. Cl. X.R.

206—46; 220—9, 29, 31; 229—14